June 11, 1929.  T. E. KANE  1,716,555
METHOD OF SPREADING OR STRETCHING MATERIAL
Filed June 8, 1926
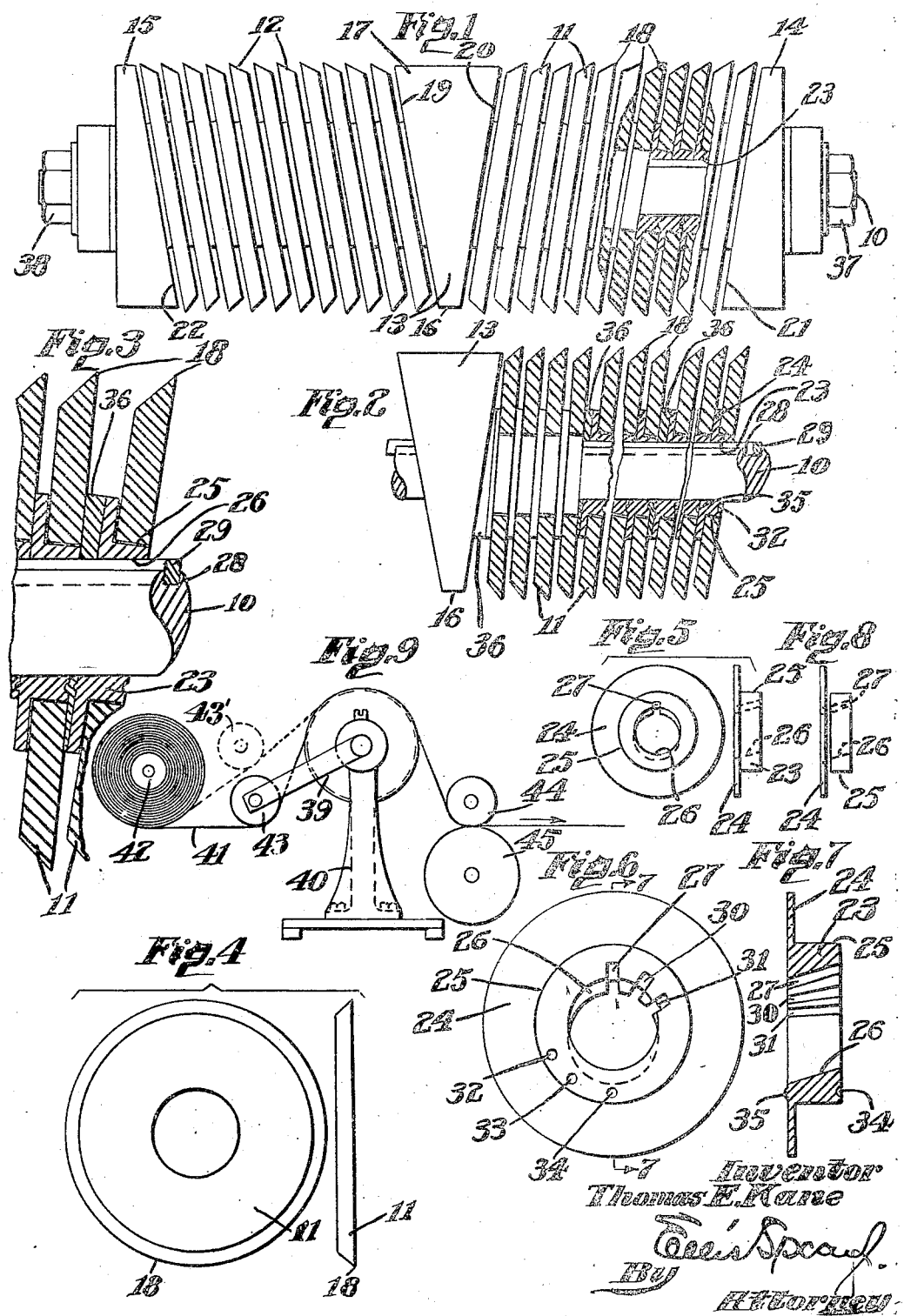

Patented June 11, 1929.

1,716,555

UNITED STATES PATENT OFFICE.

THOMAS E. KANE, OF MANSFIELD, MASSACHUSETTS.

METHOD OF SPREADING OR STRETCHING MATERIAL.

Application filed June 8, 1926. Serial No. 114,592.

This invention relates to a new and improved means for spreading or stretching material such as fabrics or other materials.

One of the objects of this invention is to provide a new and improved mechanism for stretching or spreading materials such as fabrics by increasing the width of the run of goods by subjecting the threads to a spreading or expanding action.

A further object is to provide a spreader roll of simple construction, and which is economical to manufacture.

A further object is to provide an improved spreader roll having a plurality of spreading units mounted so that each unit may rotate freely and independently of other spreader units.

A further object is to provide a spreader or expanding roll for fabrics in which the spreader units are arranged at an angle on a common shaft together with a means for readily varying the angular position of the various spreader units.

A further object is to provide in a spreader roll an improved means for mounting the independent spreader units on a shaft so that the spreader disc units are at an angle to the shaft so that each unit is independently free to rotate when the goods are drawn over the roll.

A further object is to provide in a spreader roll an improved construction whereby a series of spreader disc units may be supported on a shaft at an angle thereto, the construction being such that the supporting means for the spreader disc units may be of like construction so that the supporting units may be duplicated throughout the length of the shaft.

A still further object is to provide in a spreader roll an improved construction for mounting the independent disc units at an angle to the shaft, the supporting means being so arranged that the angle of the plane of the spreader disc relative to the axis of the shaft may be adjusted or varied by rotary movement of the means upon which the spreading disc is mounted.

In general, the spreader roll comprises a shaft, a series of bushings mounted on the shaft and held against rotary movement thereon, and a series of spreader discs, each disc being rotatably mounted on a bushing.

The spreader discs are mounted so that the plane of the discs are at an angle to the axis of the shaft other than a right angle; in order to obtain the angular disposition of the discs, the aperture passing through the bushing, which aperture is adapted to receive the shaft, is formed at an angle in the bushing so that the outer bearing surface of the bushing on which the disc rotates is at an angle to the aperture formed in the bushing.

In order to change the angular relation of one of the discs, or a certain section of the discs along the shaft, it is only necessary to rotate the bushing upon the shaft until the desired angle, or inclination of discs relative to the axis of the main shaft is obtained.

One selected embodiment of the invention is shown and described for purposes of illustrating the invention.

In the accompanying drawings, Figure 1 is a top plan view of a spreader roll showing a portion partly broken away and shown in section. In this view, all of the spreader disc units are disposed at the same angle relative to the axis of the shaft.

Figure 2 is a top plan view of a portion of one-half of the spreader roll partly broken away so as to show certain of these spreader discs in section. The spreader discs are shown at different angles.

Figure 3 is a fragment showing an enlarged section of the discs of the spreader roll showing more clearly adjacent discs which are disposed at different angles on the shaft.

Figure 4 is a front and end elevation respectively of one of the individual spreader disc units.

Figure 5 is a front and side elevation of the bearing bushing upon which the disc is rotatably supported. Such a bushing with one key-way may be provided where all of the discs are at the same angle.

Figure 6 is a front elevation of a bushing showing a plurality of key-ways in order to permit rotary movement of the bushing upon the shaft and varying the angle of inclination of the spreader disc units relative to the axis of the main shaft.

Figure 7 is a section taken on the line 7—7 of Figure 6.

Figure 8 is a modified form of bushing in which the bushing is formed in two parts; namely, a bearing portion and a spacing washer portion.

Figure 9 is a diagram illustrating one application of the spreader roll in use showing the general arrangement of a roll of cloth, and the guiding rolls for carrying the cloth over the spreader or stretching roll.

As shown in Figure 1, the roller comprises a shaft 10, a series of spreader disc units 11 on one half of the roll, and another series of spreader disc units 12 on the other half of the roll. The first section of discs 11 are disposed between a central block 13 and an end block 14, and the other section comprising the spreader disc units 12 are disposed between the central block 13 and another end block 15. The spreader discs 11 are inclined in one direction so that the plane of the spreader units are at an angle to the axis of the shaft 10, and the spreader units 12 on the other half of the roll are inclined in the opposite direction so that the plane of the spreader units are at an angle to the axis of the shaft 10. If the cloth is carried over the spreader roll, the action of the spreader discs is to spread or stretch the cloth from the center outward toward the end of the goods. The material is fed onto the roll at a point 16 corresponding to the narrow part of the central block 13, and the material leaves the roll, when the maximum spreading effect is desired, at the other side of the roll at a point corresponding to the wider part 17 of the central block. As the warp threads of the goods engage the edge 18 of the spreader units, when the material is first carried through the roll, there is a tendency, as the material is carried over the roll, for the warped threads to be carried outward from the center of the roll, and thus the stretching or spreading action is effected. It is to be understood, of course, that the disc spreader units are freely rotatable and movable with the cloth as it is carried over the roll. If the discs were stationary and at an angle, there would not be the spreading action which is effective by having the spreader units movable.

As shown in Figure 1, the sides 19 and 20 of the central block 13 are at an angle corresponding to that of the spreader units 11 and 12, respectively, on each half of the roll. Similarly, the inner faces 21 and 22 of the end blocks 14 and 15, respectively, are at an angle corresponding to that of the adjacent spreader units.

A means is provided for supporting the individual spreader disc units at an angle to the axis of the shaft 10 so as to permit free rotary movement of the spreader units as the cloth, or other material, is carried over the roll. For this purpose, there is preferably provided a bushing 23. The bushing is provided at one side thereof with an annular portion 24 which serves as a spacing washer between adjacent spreader disc units. The outer surface 25 of the bushing serves as a bearing portion upon which the spreader disc units 11 and 12 rotate. The bearing portion of the bushing, and the corresponding bearing portion of the spreader units, is concentric with the axis about which the spreader units rotate. It is to be noted, however, that this axis does not coincide with the axis of the main shaft 10. In other words, the axis about which the spreader discs rotate is at an angle to the axis of the main shaft. This angular mounting of the spreader disc is effected by providing an aperture 26 in the bushing 23, said aperture, in the form shown, being cylindrical in form to correspond, and adapted to receive the shaft 10 therein. The axis of the aperture corresponds with the axis of the main shaft, and of course, is at an angle other than a right angle to the plane of the spreader disc mounted on the outer bearing portion 25 of the bushing. Of course, in the ordinary bushing, the outer surface of the bushing is concentric with the inner aperture of the bushing so that a vertical center line of the bushing would be normal to, or perpendicular to, the horizontal axis of the bushing. The angular disposition of the central aperture of the bushing is a very desirable feature of the invention. Any suitable means may be provided for mounting the bushing upon the shaft to normally prevent relative rotary movement between the shaft and the bushing. In the preferred form shown, a key-way 27 is formed in the bushing, and another key-way 28 is formed in the shaft 10. The key-ways in the bushing and in the shaft are brought into alignment, and a key 29 is inserted and thus normally prevents relative rotary movement between the bushing and the shaft when the key is in position. It is understood that other equivalent means may be provided to prevent relative rotary movement between the bushing and the shaft. One of the desirable features of the structure above described is that the spreader units are rotatably mounted so that the planes of the discs are inclined to the axis of the shaft, being a simple and inexpensive construction in which the bearing supports for each of the spreader units are mounted upon a common shaft, and in the spreader roll shown in Figure 1 where all the discs on one-half of the roll are inclined at the same angle, the bearing bushing support for each spreader unit is of identical construction.

Under certain conditions, it may be found desirable to mount some of the spreader units throughout the length of one-half of the spreader roll at different angles of inclination. That is, it may be desirable to mount certain of these spreader discs nearer the end of the spreader roll so that the angle of inclination of such discs are greater than other spreader units nearer the center of the spreader roll. One means of mounting the spreader units, so that the plane of inclination thereof is at a greater angle, is to form the aperture in the bushing portion so that the axis of said aperture is at a greater angle to the outer bearing surface of the bushing. The angle of inclination of the spreader units may also be varied by rotating the bushing relative to the shaft upon which the bushing is mounted. In order to hold the bushings in the different adjusted positions for obtaining the different angles of inclination of the spreader unit, a plurality of key-ways, 30 and 31, (see Figures 6 and 7), may be provided. Of course, where the bushing is provided with a plurality of key-ways for obtaining the different positions of the bushing on the shaft, it is first necessary to withdraw the key 29 when it is desired to rotate the bushing from one position to the other. Preferably, there is provided a means effected between adjacent bushings to prevent accidental relative rotation between adjacent bushings when the key 29 is withdrawn. For this purpose, a recess 32, or a series of recesses or indentations 33 and 34, are provided in one face of the bushing portion, and a projection 35 is provided in the face of the adjacent bushing portion, said projection being adapted to fit within the recesses or indentations dependent upon the relative adjustment and position of the adjacent bushings.

Figure 2 shows a portion of one-half of a spreader roll in which three sections of spreader units are shown, each section being mounted at different angles. When the bushing portion is rotated on the shaft through an angle relative to an adjacent bushing member, the plane of the annular spacing portion 24 of the bushing will change. It is desirable, therefore, to interpose a special spacing member 36 so as to occupy the space formed by the rotation of the bushing. (See Figures 2 and 3.) A modified form of bushing and spacing member is shown in Figure 8 in which the main bearing portion of the bushing, and the annular portion serving as a spacing washer, is formed in two parts. It is to be understood, of course, that the thickness of the spreader disc units is slightly less than the length of the bearing portion of the bushing so as to permit complete independent rotary movement of each of the spreader disc units.

The bushings, the center block 13, and the end blocks 14 and 15 are held clamped on the shaft against relative rotary movement by the nuts 37 and 38 threaded on the ends of the shaft 10.

Figure 9 is a diagrammatic representation showing the relative arrangement of the spreader roll and other guiding rolls in use. The spreader roll 39 is shown mounted on suitable standards 40. The fabric material 41 is led from the roll, or beam 42 over a guiding roll 43, thence over the spreader roll and from the spreader roll, the material passes over another guiding roll 44. If desired, a presser roll 45 may be provided to co-operate with the roll 44 so that the material may be pressed after it has been stretched, or spread, by the spreader roll. Preferably, the guiding rolls 43 and 44 are so arranged that the material passes over one-half of the spreader roll, so that the maximum spreading action of the spreader disc units is effective. The spreading effect of the spreader units may be varied by changing the relative position of one or both of the guide rolls 43 and 44 so that a smaller portion of the circumference of the spreader roll is in contact with the material as it passes thereover. For example, one of the rolls 43, adjustably supported in any suitable manner, may be moved to the dotted line position 43', in which position, the goods 41 will be tangent to the spreading roll at a different point. It is understood, of course, that in the ordinary operation in which the maximum spreading effect of the spreader units is obtained, that the material should be fed on to the spreader roll at the point where the central block 13 is the narrowest. It is also understood that if desired, a series of these spreader rolls may be provided so that the material will successively pass from one spreader roll to the other.

In the above description, where reference is made to the varying or changing of the angle of inclination of the spreader disc units by rotation of the bushings relative to the shaft, such expression, of course, is to be understood to refer to the angular inclination of the outer perimeter of the spreader units which is in contact with the material as it passes over the spreader roll, and which is effective to produce the spreading or stretching action upon the material passed over the spreader roll. The expression was used in the relative sense. The change in the angle of inclination of the spreader discs, which is effective in producing the spreading action is the angle referred to, and becomes apparent when the roller is viewed from a given plane for the different positions assumed by the spreader units as the bushing is rotated.

One of the desirable features of the spreader roll is that each of the spreader units is independently free to rotate, and each unit presents or offers but one continuous line of contact, or engagement with the material as it passes over the roller. The advantage and importance of this feature is that the spreader units may be adjusted to different angular positions and still maintain the continuous line of contact, or engage with the material passed thereover. This feature is an advantage over other types of rollers known in the art in which a succession of points is provided on the periphery of a single unit, so that it is only possible for all of the points on one unit to be effective for only one position of the unit. If it is desired to vary the angle of all of the spreader units throughout the length of the shaft, which is effective in producing the spreading action, this may be accomplished by turning the spreader roll as a unit the required amount. When this is done, it may be desirable to change the position of the guide rolls 43 and 44 so as to vary the extent of the arc of contact of the material with the spreader roll 39.

While a certain preferred and modified form of the invention has been shown and described for the purposes of illustration, it is understood that various changes and modifications may be made without departing from the spirit and scope of the invention.

Preferably, the bushing member, which serves as the bearing support and means for permitting rotation of the spreader disc units about an axis out of parallelism with the axis of the shaft, is composed of a self-lubricating metal. This is a very desirable feature, because it is not necessary to use oil, or other lubricants, which would be likely to soil or injure the cloth or other material that might be passed over the roller. Such self-lubricating metals usually contain graphite, or other lubricating alloy.

What I therefore claim and desire to secure by Letters Patent is:

1. In a spreader roll, a shaft, bushings keyed thereto and presenting bearing surfaces angularly disposed relative to said shaft and flanged to provide spacers, and spreader discs mounted on said bearing surfaces and space from each other by said spacer flanges.

2. In a spreader roll, a shaft, bushings keyed thereto and presenting bearing surfaces angularly disposed relative to said shaft and flanged to provide spacers, and spreader discs mounted on said bearing surfaces and spaced from each other by said spacer flanges, some of said bearing surfaces being of different angularity whereby to dispose certain of the spreader discs at relatively different angles longitudinally of the shaft.

3. In a spreader roll, a shaft, bushings keyed thereto and presenting bearing surfaces angularly disposed relative to said shaft and flanged to provide spacers, and spreader discs mounted on said bearing surfaces and spaced from each other by said spacer flanges, and said bushings having a plurality of keyways spaced circumferentially from each other whereby different keyways may be selectively used to give different angularity to the bearing surfaces relative to said shaft.

THOMAS E. KANE.